Feb. 4, 1969
C. H. WORSHAM ETAL  3,425,873
PROCESS OF AUTOMATICALLY CONTROLLING FUEL
CONCENTRATION IN FUEL CELL
Filed Dec. 19, 1963
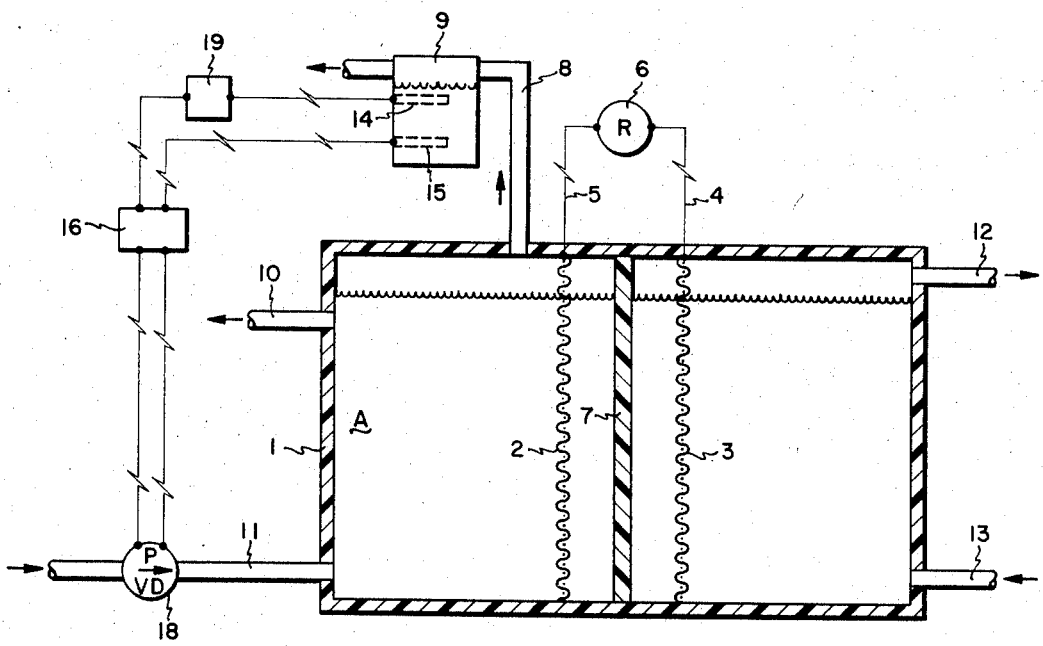
Charles H. Worsham
Duane G. Levine   INVENTORS
BY  *Henry Berk*
PATENT ATTORNEY 3,425,873
PROCESS OF AUTOMATICALLY CONTROLLING FUEL CONCENTRATION IN FUEL CELL
Charles H. Worsham and Duane G. Levine, Fanwood, N.J., assignors to Esso Research and Engineering Company, a corporation of Delaware
Filed Dec. 19, 1963, Ser. No. 331,876
U.S. Cl. 136—86   4 Claims
Int. Cl. H01m 27/12

This invention relates to new and useful improvements in electrochemical cells and particularly to those cells designated as fuel cells for the production of electric current. In particular, this invention is directed to a system for controlling the input of fuel to the fuel cell. More particularly, the invention relates to a method of controlling the input of a liquid fuel to a fuel cell by sensing the amount of fuel in the exhaust.

The problem with using liquid fuels which are added directly to the aqueous electrolyte of an electrochemical or fuel cell has been the maintenance of the fuel concentration within predetermined limitations. Such limitations as to the concentration is dependent upon the amount of current to be produced by the cell. Those skilled in the art can readily determine the amount of fuel necessary to be oxidized at the anode to afford a particularly desired current density. Heretofore, the art has employed various means for controlling the amount of fuel to be added to the cell. These means have included a pump which would deliver the fuel to the cell at a predetermined rate. Such pumps have proved to be inefficient in that they cannot maintain the desired flow for long periods of sustained operation. Another method of controlling the input has been to check the amount of current being produced by the cell so that as the output current diminishes below the desired current level, more fuel is added. That is undesirable in that of necessity, you have a fluctuating current output. Another method has been to monitor the concentration of the fuel in the cell electrolyte. This has proven to be undesirable in that the electrolyte impurities are a source of trouble and make this system very difficult to standardize.

It has now been found that the fuel concentration in the cell can be effectively controlled by determining the amount of fuel in the exhaust. This is unusual since the amount of fuel in the exhaust is not directly dependent upon the current being produced from the cell, but is rather dependent upon the amount of fuel in the electrolyte at a point distant from the electrode. In this regard, see the discussion of the drawing infra. The amount of fuel in the exhaust depends upon the partial vapor pressures of the water and fuel in the cell which is a function of the temperature rather than the amount of current being produced.

In accordance with this invention, the exhaust gases comprising essentially carbon dioxide, water vapor and vaporized fuel are removed from the cell and condensed. The exhaust condensate is primarily composed of water and fuel. No elaborate system is necessary to condense the exhaust gases, since the fuels to be used are liquids at room temperature. Therefore, as the exhaust gases exit from the cell and are removed to a condenser, the ambient temperature of the cell's environment will cause the water and fuel to condense. A slight trace of the electrolyte will also be present in the exhaust condensate. The amount of fuel in the exhaust condensate may be determined either by measuring the specific gravity of the condensate or by measuring the current density that can be carried through the condensate solution. The specific gravity difference between water and the fuel is large so that specific gravity is a sensitive measure of the fuel content. A very simple device can be used to check the specific gravity of the exhaust condensate, such as the float device set forth in U.S. Patent 3,054,296. The current density which can be carried by the exhaust condensate can be ascertained by immersing two small electrodes therein. The electrodes will be driven, that is, power will be supplied to the electrodes by a DC source such as flashlight batteries or by the cell itself. When using a driven electrode, the amount of current that can be carried will be a function of the concentration of the fuel, that is, an increase in the fuel concentration allows an increase in the current density and a decrease in the fuel concentration brings about a corresponding decrease in the current density. One skilled in the art can readily determine that concentration in the exhaust condensate which will afford the necessary concentration in the cell to provide the desired current output. Addition of fuel is automatically regulated through a calibrated control device.

To more particularly set forth the invention, reference is made to the drawing which is a schematic of a typical fuel cell. The drawing is not to be construed as a limitation upon the scope of the invention, but is rather for the purpose of clearly setting forth applicants' invention.

Referring now to the drawing. There is shown an electrolyte container 1 adapted to retain an aqueous electrolyte. An anode 2 and a cathode 3 are connected external to the fuel cell by electrical conductors 4 and 5 to a resistance 6. Said resistance 6 denotes any device which is driven by an electrical current. Ion-permeable barrier 7 may or may not be a necessary feature depending upon whether or not the anode and cathode are inert with respect to each other. Exhaust conduit 8 conducts the exhaust gases from the cell to condenser 9 wherein the exhaust condensate collects. Condenser 9 may be fitted with valve and conduit means, not shown, to return the condensate to the fuel cell or to dispose of same exterior to the fuel cell. Conduits 10 and 11 are used to circulate the fuel electrolyte mixture to the cell. Conduits 12 and 13 are for the circulation of the oxidant, normally either oxygen or air, so that the oxygen enters through conduit 13 and exits through conduit 12. Elements 14 and 15 are electrodes inserted into the condenser 9. The two electrodes are driven by a power source 19 which can be a pair of 1.5 volt flashlight batteries. The power furnished by the power source 19 is conducted from electrode 14 through the condensate in condenser 9 to electrode 15 and then by suitable conducting means, i.e. a fine copper wire, to control means 16. Control means 16 is an electrically actuated switch which controls the speed of fuel pump 18. Switch 16 can be operated by an outside power source or by the fuel cell itself. This system affords a means of controlling the input of fuel to the fuel cell in response to the amount of fuel in condenser 9. That is, the amount of current that can be conducted between the electrodes 14 and 15 will be directly dependent upon the amount of fuel in the condensate in condenser 9. Switch 16 is actuated by the change in the amount of current carried between electrodes 14 and 15 so that as the current increases, the switch will reduce the speed of fuel pump 18 and as the current between electrodes 14 and 15 decreases, the switch increases the speed of operation of pump 18. The concentration of the fuel in condenser 9 will be directly proportional to the concentration of the fuel at some point distant from the anode, such as point A. This will differ from the concentration of the fuel at the anode. Concentration of the fuel at the anode will depend upon the amount of fuel being oxidized at a given time.

The invention of this cell is designed to work with fuel cells employing aqueous electrolytes such as aqueous KOH, NaOH, $H_2SO_4$ and $H_3PO_4$.

In the practice of this invention, the cells of necessity must utilize a fuel which is liquid at ambient temperatures.

Such fuels include alcohols such as methanol, ethanol, pentanol; glycols such as ethylene glycol; ketones such as acetone, methylethyl ketone, methylpropyl ketone and aldehydes such as formaldehyde and $C_5$–$C_{14}$ hydrocarbons. All of these fuels are well-known in the art. See, for example, U.S. Patent 2,925,454.

This invention will be more fully understood from the following examples which are for illustration only and are not to be construed as limitations upon the scope of the invention as set forth in the appended claims.

EXAMPLE 1

The effectiveness of this invention was checked by monitoring the amount of fuel in the condensate of the fuel cell employing 30 weight percent sulfuric acid as the electrolyte at both the anode and the cathode. A platinum screen with platinum black thereon was used as the anode and a platinum screen was used as the cathode. Methanol was used as the fuel and air as the oxidant. The temperature of the cell was maintained at about 180° F. The exhaust gases were removed from the cell and condensed. The amount of fuel in the exhaust gases was checked by using a float connected to an electromagnet which varied the input of the fuel. This device was effective in controlling the methanol concentration in sustained operation for more than 520 hours.

EXAMPLE 2

An alternate method of checking the fuel concentration in the exhaust was conducted by utilizing a cell as set forth in Example 1. In place of the float device used to check the specific gravity in Example 1, two platinum black electrode wires were used. The two wire electrodes were connected to two flashlight batteries and to a milliamp meter. The electrodes were connected to a fuel pump through an electrically actuated control so that as the current increased, the flow of fuel is decreased and as the current decreased, the flow of fuel was increased so that the fuel concentration was maintained between predetermined limits of 0.8 to 1.5 volume percent of methanol. This electrical device afforded relatively constant concentration over a sustained period of operation of 1000 hours.

What is claimed is:

1. A method of controlling the fuel concentration in a fuel cell employing an aqueous electrolyte and a liquid carbonaceous fuel which comprises condensing the exhaust gases from said cell, said gases comprising essentially carbon dioxide, water vapor and vaporized carbonaceous fuel, continually sensing the fuel concentration in the exhaust condensate and varying the fuel input to said cell in response to the concentration of the fuel in said exhaust condensate.

2. A method as in claim 1 wherein the fuel concentration is sensed by measuring the specific gravity of the exhaust condensate.

3. A method as in claim 1 wherein the fuel concentration is sensed by measuring the current density between two driven electrodes immersed in the exhaust condensate.

4. A method as defined in claim 1 wherein said liquid carbonaceous fuel is methanol.

References Cited

UNITED STATES PATENTS

| | | | |
|---|---|---|---|
| 1,388,613 | 8/1921 | Simsohn. | |
| 1,399,200 | 12/1921 | Edelman. | |
| 2,701,210 | 2/1955 | Fisher et al. | 23—253 X |
| 2,925,455 | 2/1960 | Eidensohn et al. | 136—86 |
| 3,074,277 | 1/1963 | Hill. | |
| 3,107,184 | 10/1963 | Gilbert | 136—86 X |
| 3,113,049 | 12/1963 | Worsham | 136—86 |
| 3,161,546 | 12/1964 | Yeager et al. | 136—86 |
| 3,216,861 | 11/1965 | Cohn et al. | 136—86 |

ALLEN B. CURTIS, *Primary Examiner.*